Patented Feb. 15, 1938

2,108,644

UNITED STATES PATENT OFFICE 2,108,644

GREASE

Lawrence C. Brunstrum, Chicago, Ill., assignor to Standard Oil Company, Chicago, Ill., a corporation of Indiana No Drawing. Application March 22, 1934, Serial No. 716,911

12 Claims. (Cl. 87—9)

This invention relates to certain new and novel greases and constituents for greases. More particularly, it relates to improved greases of the type known as cup greases.

It is an object of my invention to provide a grease, particularly a grease of the cup grease type, suitable for use at temperatures much higher than those at which prior art greases of this type can be used successfully. Another object of my invention is to provide a grease which will not break down or separate on being subjected to high temperatures and to repeated heating and cooling. A further object is to provide a grease which will not contribute to the failure of bearings in which it is used at any temperature short of the temperature at which the grease commences to burn or carbonize. A still further object of my invention is to provide a grease, particularly a grease of the cup grease type, which will not separate to any appreciable extent on cooling from high temperatures and which will not form hard gum-like soapy masses which contribute to bearing failure.

Further and more detailed objects of my invention will become apparent as the description thereof proceeds. The ordinary lime soap greases commonly known as cup greases are of great utility and are usually the most important products of a typical grease works. One reason for their wide application is their smooth consistency and the fact that this consistency remains a constant after a certain amount of working takes place so that the grease does not continue to lose consistency on further working. In spite of these and other advantages of ordinary cup greases, they have had one serious disadvantage which has greatly limited their applicability. This disadvantage is their tendency to break down or separate on heating to high temperatures or on cooling from high temperatures. This separation results in the loss of most of the oil and in the precipitation of hard gum-like soap-containing masses which have practically no lubricating value and which in fact actually contribute to the failure of the bearing on which the grease is used. Thus, in the past, it has been considered impracticable to use cup greases above temperatures ranging from 160° F. to about 175° F. on ordinary bearings. This temperature depends somewhat on the concentration of soap in the particular grease used, the maximum safe operating temperature increasing with the soap content. With very high soap contents, say 25-35% and with special soaps made from acids split from hydrogenated fats by certain recently developed high temperature processes it is sometimes possible to raise the upper limit to 190-220° F., but such high limits have been the exception rather than the rule. For use on ball bearings, and similar high pressure bearings, ordinary cup greases are limited to still lower temperatures, the maximum safe operating temperatures being about 40° F. lower than those above given for ordinary bearings.

I have overcome these disadvantages of the prior art cup greases by the use of a small amount of a novel type of stabilizing agent which when present in small amounts, for instance from 3% to 6%, in an ordinary cup grease will prevent separation at high temperatures. My greases can be used at temperatures as high as 300° F., 400° F. or even 450° F., depending somewhat on the viscosity of the oil being used, without separating material which will produce bearing failure. The grease may liquefy at these higher temperatures and the oil viscosity may be too low for effective lubrication, but my greases do not in any way contribute to bearing failure as do those of the prior art. However, it is preferred to use my greases at normal operating temperatures below about 250° F. Instead of separating to form hard soapy masses from which the oil is rapidly lost and which produce bearing failure, my greases retain their homogeneity even up to the temperatures at which they begin to burn or carbonize. On cooling from high temperatures they likewise retain their homogeneity, or if separating at all, separate only to a slight extent producing a slightly murky appearance, rather than separating out a hard soap-containing mass.

The substances which I find to produce these highly desirable results are in particular the partial esters of polyhydric alcohols and fatty acids. As a polyhydric alcohol I prefer glycol, but glycerine, propylene glycol and other polyhydric alcohols can be used. As fatty acids, various saturated or unsaturated compounds, preferably within the range of from 13 to 20 carbon atoms, inclusive, per molecule can be used. For instance, stearic, oleic, palmitic and arachidic acids are suitable. Commercial mixtures of fatty acids such as animal fatty acids, beta fat (cottonseed fatty acids), etc. can also be used as constituents of the partial esters which I find valuable as stabilizing agents. Hydrogenated fatty acids split from hydrogenated fats can also be used. The term fatty acid as used herein applies to all of the foregoing and also applies to such simple fatty acid derivatives as the hydroxy fatty acids, for instance, ricinoleic acid.

One suitable partial ester of a polyhydric alcohol and a fatty acid is monoglycol stearate:

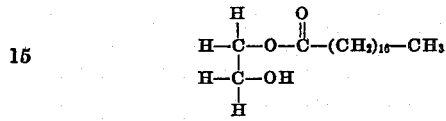

Another suitable partial ester is diglycol distearate,

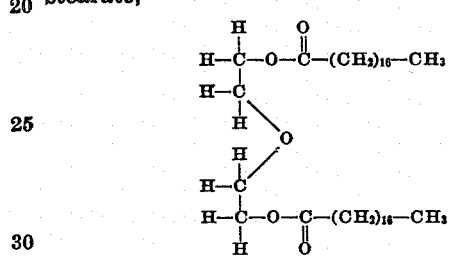

which is merely a condensation product made from two molecules of monoglycol stearate by the elimination of one molecule of water and is therefore also to be looked upon as a partial ester of a polyhydric alcohol and a fatty acid.

Amongst other partial esters of polyhydric alcohols and fatty acids may be mentioned the following:

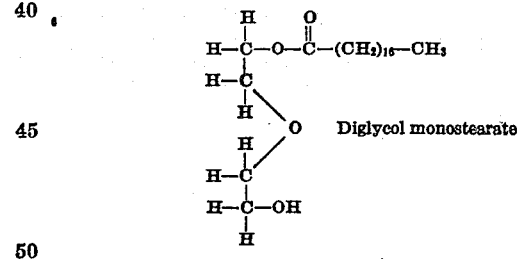

Diglycol monostearate

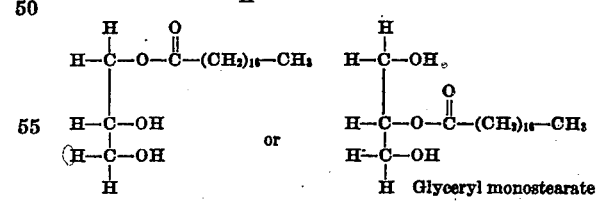

Glyceryl monostearate

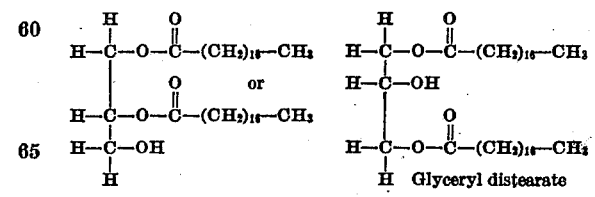

Glyceryl distearate

It will be understood that any of the above compounds can be modified by the use of other fatty acids in place of the stearic acid indicated. Furthermore, commercial mixtures of various esters can be and commonly will be used in place of the pure chemical compounds.

Thus, for instance, most of my experimental work was done using a commercial product known as diglycol stearate which apparently consists of about 80% of diglycol distearate, about 15% of diglycol mono-stearate, about 4% of monoglycol stearate and about 1% of monoglycol distearate together with a trace of water. While referred to as a stearate, this product is normally made from ordinary commercial "stearic acid" containing about 60% palmitic acid and 40% stearic acid. This mixture of esters will hereinafter be referred to as commercial diglycol stearate.

While it is possible to obtain very striking results by the use of my new stabilizing agents I find that these results can only be obtained by controlling the amount used within certain critical limits. As will hereinafter be described, these critical limits vary with the oil viscosity and soap content but for typical greases they lie within the range of from about 2% to about 8% or preferably from about 3% to about 6%. If too little of the stabilizing agent is used it fails to prevent separation and the desired results are therefore not obtained. If, on the other hand, too large an amount is used, the finished grease becomes murky on cooling from high temperatures or, in extreme cases, even separates on cooling. Furthermore, the maximum amount of stabilizing agent must be closely controlled since my stabilizing agent is not a stiffening agent but actually tends to thin the resulting grease quite markedly so that in order to secure the same stiffness when using my stabilizing agent as without it, it is necessary to increase the soap content.

In determining the critical limits of the stabilizing agent content, namely, the lower limit below which the grease is not stable at high temperatures and the upper limit above which the grease becomes soft and murky or tends to separate on cooling from high temperatures, I find that these limits vary with the viscosity of the oil and with the soap content of the grease. Moreover, it appears that there may be some fundamental relationship involved since the optimum amount of stabilizing agent varies directly as the square root of the soap content and also directly as the square root of the kinematic viscosity of the oil at 100° F. This can be expressed by the following formula:

$$S = C\sqrt{S' \cdot K}$$

In which S is the number of parts by weight of stabilizing agent in 100 parts by weight of the total grease; C is a constant; S' is the number of parts by weight of soap in 100 parts by weight of the total grease; and K is the kinematic viscosity of the oil contained in the grease expressed in stokes and measured at 100° F. K is in turn equal to the absolute viscosity of the oil in poises (eta) divided by the density of the oil in grams per cubic centimeter (rho). Moreover, for commercial diglycol stearate, C appears, at the optimum, to equal unity, the lower limit for satisfactory greases being about 0.5 and the upper limit about 2.5, although C can in some cases be as low as 0.3 with some beneficial result, and in other cases, particularly where very light oils and/or very low soap contents are used, can be as high as 3 or even 4.

This equation can be used throughout the whole range of soap contents and oil viscosities, say from about 3% to about 35% soap and from about 70 to 2000 or even 3000 seconds Saybolt at 100° F.

It will be understood that the foregoing equation and the operative limits of the constant C are highly important and appear to have a fundamental significance, and that they appear to apply not only to commercial diglycol stearate, as to which they were principally developed, but also to a large number of other stabilizing agents of similar type as will hereinafter be pointed out. It is to be realized, however, that these limits do not draw a sharp line between operability and non-operability. On the contrary, the zone of operability tends to merge gradually into the zone of non-operability. Furthermore, the limits of the constant C will vary somewhat with such factors as the source and nature of the oil used, the precise chemical compound used as a stabilizing agent, the character and amount of other constituents present, etc.

As a guide to those who do not have kinematic viscosity data available, the following table gives the optimum amount of stabilizing agent for various soap concentrations and oil viscosities in Saybolt seconds at 100° F., the constant C being taken as unity:

*Percent stabilizing agent recommended at oil viscosity and soap content specified*

| Oil viscosity | 80 | 100 | 200 | 300 | 400 | 800 | 1600 |
|---|---|---|---|---|---|---|---|
| Soap content (percent) | | | | | | | |
| 5 | 0.9 | 1.0 | 1.5 | 1.8 | 2.1 | 3.0 | 4.2 |
| 10 | 1.3 | 1.4 | 2.1 | 2.6 | 3.0 | 4.2 | 5.9 |
| 15 | 1.5 | 1.7 | 2.5 | 3.1 | 3.6 | 5.1 | 7.3 |
| 20 | 1.8 | 2.0 | 3.0 | 3.6 | 4.2 | 5.9 | 8.4 |
| 25 | 2.0 | 2.3 | 3.3 | 4.0 | 4.7 | 6.6 | 9.4 |

The greases embodying my invention can suitably be made in accordance with the ordinary cup grease practice, or in pressure kettles, the stabilizing agent being added at the end of the otherwise conventional manufacturing operation but prior to final cooling. Thus, for instance, my greases can suitably be made by mixing the necessary lime with a small amount of water, and an amount of oil about equal to the fatty acid to be used, in a steam-jacketed grease mixing kettle. The fatty acid to be used in the manufacture of the soap is then added and heat is applied. After an interval of about 40 to 60 minutes, when the temperature has reached 240–260° F., the soap is ready for mixing. About 2% to 3% of water is added, and when the batch foams up it is driven down by the addition of oil, the heat being abstracted by the addition of cold oil and by the vaporization of water so that the temperature drops to about 230° F. Oil is added until the batch contains about 25% soap, and during this interval the temperature drops gradually until it reaches about 205–210° F. If the desired soap percentage is about 15, the batch should reach a temperature of about 180–190° F. at this point. This process is about the same when fats are used instead of fatty acids except that it requires 12 to 20 hours at 240–260° F. to effect the saponification of the fats. After the addition of the final amount of oil, but prior to final cooling, the desired amount of stabilizing agent is added and stirred in and the grease is then cooled and packaged in the normal manner. The following examples give certain typical formulae which I have found satisfactory as embodiments of my invention:

*Example 1*

|  | Percent |
|---|---|
| Soap (calcium salt of fatty acids split from hydrogenated fats) | 23 |
| Stabilizing agent (commercial diglycol stearate) | 3.8 |
| Water (approximate) | 1 |
| Refined Mid-Continent lubricating oil (approximate) | 72.2 |
| | 100 |

The oil used had a viscosity of about 300 seconds Saybolt at 100° F. The constant C figures to be 0.99 for the above formula.

*Example 2*

In a formula otherwise identical with the above the soap content was reduced to 14.4% and the oil content increased to compensate. A satisfactory grease stable at high temperatures was produced. C in this case was 1.23.

*Example 3*

|  | Percent |
|---|---|
| Soap (calcium salt of fatty acids split from hydrogenated fats) | 13.5 |
| Stabilizing agent (commercial diglycol stearate) | 4.0 |
| Refined Mid-Continent lubricating oil | 82.5 |
| | 100 |

The oil used had a viscosity of only 80 seconds Saybolt at 100° F. and the foregoing table indicates an optimum stabilizing agent content of 1.4%. This was greatly increased since a soft dehydrated grease was desired. C in this case was 2.75 and the grease was still stable at high temperatures. This is an example of a stabilizing agent content near the upper limit.

*Example 4*

|  | Percent |
|---|---|
| Soap (calcium salt of fatty acids split from hydrogenated fats) | 24 |
| Stabilizing agent (commercial diglycol stearate) | 4 |
| Water (approximate) | 1 |
| Refined Mid-Continent lubricating oil (approximate) | 71 |
| | 100 |

The oil used had a viscosity of 900 seconds Saybolt at 100° F. Due to the high soap content and high oil viscosity, C for this product is 0.56, whereas in Example 3 with the same stabilizing agent content C was 2.75. Example 3 is near the upper limit and is commercially feasible only because a soft grease is desired in this particular case. Example 4 is near the lower limit. The grease did not actually separate at high temperatures but was not really satisfactory.

*Example 5*

A series of greases was made to show the effect of a stabilizing agent prepared by heating equal weights of glycol and a commercial mixture of hydrogenated vegetable oil fatty acids together for four hours at about 200° F. in the presence of HCl gas. The excess of glycol was then removed by washing with cold water. This product was probably predominantly an ester formed from one molecule of glycol and one molecule of hydrogenated fatty acid but no doubt contained a minor amount of an ester formed from one molecule of glycol and two molecules of hydrogenated fatty acid.

An ordinary prior art grease was made up as a blank or control containing 18% soap (calcium salt of fatty acids split from hydrogenated fats), 81% oil (refined Mid-Continent lubricating oil having a viscosity of about 300 seconds Saybolt at 100° F.) and 1% water. To this blank various amounts of the stabilizing agent mentioned in the last paragraph were added and the resultant greases were tested by heating at 350° F. for 3 hours and subsequently cooling. The results were as follows:

| Percent stabilizing agent | C | Quality of grease |
|---|---|---|
| 0.0 (blank) | 0.0 | Separates markedly |
| 0.5 | 0.15 | Poor grease but less separation than blank |
| 1.0 | 0.29 | Poor grease but still less separation |
| 2.0 | 0.59 | Fair grease—slight tendency to separate |
| 3.0 | 0.89 | Good greases—softness increases (penetration increases) as stabilizing agent content increases |
| 4.0 | 1.19 | |
| 5.0 | 1.50 | |
| 6.0 | 1.81 | |
| 7.5 | 2.28 | Fair grease—tendency towards murkiness—too soft |
| 10.0 | 3.24 | Poor grease—very murky—very soft |

It thus appears that in the above formula the optimum amount of stabilizing agent is about 3 to 6%.

Example 6

Greases were also made up using the same basic cup grease or blank as in Example 5 and adding as stabilizing agents esters formed from one molecule of glycerine and one or two molecules of hydrogenated fatty acid. The addition of 4.0% by weight ($C=1.2$) of either of these stabilizing agents produced a grease which was highly satisfactory at high temperatures and did not separate on cooling.

In comparison, greases were also made up using the same blank and 2.0, 3.0, 4.0, and 5.0% by weight of an ester formed from one molecule of glycerine and three molecules of hydrogenated fatty acid (in other words a synthetic hydrogenated fat). None of these greases was at all satisfactory. They all separated on cooling from high temperatures to about the same extent and in about the same manner as did the blank.

Example 7

| | Percent |
|---|---|
| Soap (calcium salt of fatty acids split from hydrogenated fats) | 18 |
| Stabilizing agent | 4 |
| Water | 1 |
| Refined Mid-Continent lubricating oil | 77 |
| | 100 |

The stabilizing agent used in this case was commercial diglycol oleate, similar to the commercial diglycol stearate previously described except for the substitution of commercial oleic for commercial stearic as the acid part of the mixed esters. The oil used had a viscosity of about 300 seconds Saybolt at 100° F. The grease was completely satisfactory for high temperature use but was slightly softer than a corresponding diglycol stearate grease. As applied to the above grease, C was equal to 1.17.

Example 8

Glycerol stearate (a mixture of the mono and di-stearates with some inert tristearate) was used as the stabilizing agent in the formula of Example 7 with the production of a satisfactory grease having good high temperature stability.

While I prefer to manufacture my greases in accordance with the conventional cup grease practice in which a small amount of water, say from one-half to one and one-half percent, is left in the finished grease it is also possible to make my greases in a completely anhydrous form by boiling off all the water (see, for instance, Example 3). In this case, it is necessary to cool the grease rapidly in order to secure the desired structure. This can be done by the use of cooling coils, or chilled rolls or by pouring the hot grease out in layers of, preferably, not over about one inch in thickness at ordinary atmospheric temperatures. The result is a crystal clear grease, which like those containing water, will not separate at high temperatures. These anhydrous greases have some marked advantages but do not have the conventionally desirable structure and properties of the hydrous greases.

The use of my stabilizing agents is particularly valuable in connection with ordinary cup greases, i. e., calcium soap greases. I prefer to use calcium hydrogenated fatty acid soap but calcium animal fatty acid soap and other calcium soaps are completely satisfactory. Relatively small amounts of soaps of other metals can be used along with the calcium soap, for instance, sodium soap, or the stabilizing agents can be used in greases which do not contain calcium soaps at all, for example, zinc soap greases. However, in these cases the effect is much less marked and the results are less desirable than in the case of calcium soap greases.

My greases normally consist of mineral lubricating oil, soap, the indicated percentage of stabilizing agent and not to exceed about 3% water. However, other relatively inert materials can be used, such as powdered metals, flake graphite, mica, asbestos fibers, small amounts of glycerine, fats, etc., without departing from the spirit of my invention. Such relatively inert materials are not to be included as constituents of the grease in applying the above formula and table or in interpreting the appended claims.

As above pointed out, my preferred stabilizing agents are the partial esters of polyhydric alcohols and fatty acids and it appears that the presence of one or more free hydroxyl groups, or ether linkages as in diglycol distearate, is important in giving the desired high temperature stability effect. As shown under Example 6, this effect is not given at all by fats which are, of course, complete esterification products of glycerine. Furthermore, when fats are saponified incompletely, the saponification products do not give the desired high temperature stability. This, I believe, is due to the fact that when saponification takes place no partial esters are formed, the result of an incomplete saponification being merely that some of the molecules are completely saponified and others are left completely unsaponified. However, this may be, it is true that the presence of fats or of incompletely saponified fats as in some of the prior art greases does not give the high temperature stability which is so marked in the case of the partial esters of polyhydroxy alcohols and fatty acids.

I do find, however, that desirable results can be obtained to a considerable degree from the use of the complete esterification products of glycol or of mono-hydric alcohols and although the results obtained with these compounds are usually much less satisfactory than those obtained with the partial esters of polyhydric alcohols and fatty acids, they do have a very definite effect. It may, therefore, well be that the true criterion of a satisfactory ester is that it must not contain more than two fatty acid groups. This may account for the operability of the partial esters as well as for the operability of monoglycol distearate and the esters of the monohydric alcohols and may at the same time account for the non-operability of the fats. Furthermore, the fact that these esters operate in somewhat the same manner as do the partial esters is borne out by the fact that the foregoing equation for the critical limits of the amount of stabilizing agent to be used appears to apply in a general way to these compounds also.

The following is an example of the use of a complete esterification product:

Example 9

Butyl ricinoleate was used as the stabilizing agent in the formula of Example 7 with the production of a grease which leaked oil to some extent but did not precipitate a hard soapy mass but rather a soft soap-oil mixture having considerable lubricating value. This grease could therefore be used at high temperatures without contributing to bearing failure but would not be as satisfactory as the greases of the prior examples.

I also find that cup greases stable at high temperatures can be produced by the use of glycol or such monohydric alcohols as boil above the temperature at which the grease is to be used, say above 200° F. or 250° F. However, these products are not, in general, as satisfactory as those containing the esters aforementioned.

While I have described my invention in connection with certain theories of operation it is to be understood that these are given by way of illustration only and not by way of limitation. I have furthermore described my invention in connection with various specific embodiments thereof but it is to be understood that I do not mean to be limited thereby except to the scope of the appended claims which should be construed as broadly as the prior art will permit.

I claim:

1. A calcium soap grease stable at temperatures in excess of about 300° F. and containing less than about 3% of water, comprising as a stabilizing agent from about 2% to about 8% of a partial ester of a polyhydroxy alcohol and a fatty acid.

2. A calcium soap grease stable at temperatures of from about 300° F. to about 400° F., and containing less than about 3% of water comprising as a stabilizing agent from about 2% to about 8% of a partial ester of a polyhydroxy alcohol and a fatty acid.

3. A cup grease which does not separate on cooling from temperatures in excess of about 300° F., comprising as its important constituents from about 3% to about 35% of calcium soap, mineral lubricating oil, not to exceed about 3% of water, and from about 3% to about 6% of a partial ester of a polyhydroxy alcohol and a fatty acid.

4. A cup grease which does not separate on cooling from temperatures in excess of about 300° F., comprising as its important constituents, calcium soap, from about 3% to about 35% of mineral lubricating oil, not to exceed about 3% of water, and from about 3% to about 6% of a partial ester of a polyhydroxy alcohol and a fatty acid.

5. A substantially anhydrous calcium soap grease stable at high temperatures comprising mineral oil, from about 5% to about 10% of calcium soap, and from about 2.5% to about 5% of a partial ester of a polyhydroxy alcohol and a fatty acid.

6. A cup grease stable at temperatures in excess of 400° F. and which does not separate on cooling from temperatures in excess of 400° F., comprising as its important constitutents, from about 3% to about 35% of calcium soap, mineral lubricating oil, not to exceed about 3% of water, and an amount of a partial ester of a polyhydroxy alcohol and a fatty acid determined by the use of the following formula:

$$S = C\sqrt{S'.K}$$

in which S is the number of parts by weight of said partial ester in 100 parts by weight of said cup grease, C is a number ranging between about 0.5 and about 2.5, S' is the number of parts by weight of said calcium soap in 100 parts by weight of said cup grease, and K is the kinematic viscosity of said mineral lubricating oil expressed in stokes.

7. A cup grease stable at temperatures in excess of 400° F. and which does not separate on cooling from temperatures in excess of 400° F., comprising as its important constituents, calcium salt of fatty acids split from hydrogenated fats, mineral lubricating oil, not to exceed about 3% of water, and an amount of commercial diglycol stearate determined by the use of the following formula:

$$S = C\sqrt{S'.K}$$

in which S is the number of parts by weight of said commercial diglycol stearate in 100 parts by weight of the total of said important constituents, C is a number which approximates unity, S' is the number of parts by weight of said calcium salt of fatty acids split from hydrogenated fats in 100 parts by weight of the total of said important constituents, and K is the kinematic viscosity of said mineral lubricating oil expressed in stokes.

8. A calcium soap grease stable at temperatures in excess of about 300° F. and containing less than about 3% of water, comprising as a stabilizing agent from about 2% to about 8% of an ester of an alcohol and a fatty acid, said fatty acid containing from 13 to 20 carbon atoms per molecule, said ester containing not more than two fatty acid groups.

9. A cup grease which does not separate on cooling from temperatures in excess of about 300° F., comprising as its important constituents from about 3% to about 35% of calcium soap, mineral lubricating oil, not to exceed about 3% of water, and from about 2% to about 8% of an ester of an alcohol and a fatty acid, said fatty acid containing from 13 to 20 carbon atoms per molecule, said ester containing not more than two fatty acid groups.

10. A cup grease which does not separate on cooling from temperatures in excess of about 300° F., comprising as its important constituents from about 3% to about 35% of calcium soap, mineral lubricating oil, not to exceed about 3% of water, and from about 3% to about 6% of an ester of an alcohol and a fatty acid, said fatty acid containing from 13 to 20 carbon atoms per molecule, said ester containing not more than two fatty acid groups.

11. A substantially anhydrous calcium and sodium soap grease which does not separate on cooling from temperatures in excess of about 300° F., comprising a major proportion of calcium soap and a minor proportion of sodium soap, a mineral lubricating oil and from about 2% to about 8% of a partial ester of a polyhydroxy alcohol and a fatty acid which contains from 13 to 20 carbon atoms per molecule.

12. A substantially anhydrous grease which does not separate on cooling from temperatures in excess of about 300° F., comprising a fatty acid soap selected from the group consisting of calcium soap and zinc soap, a mineral lubricating oil and from about 2% to about 8% of a partial ester of a polyhydroxy alcohol and a fatty acid which contains from 13 to 20 carbon atoms per molecule.

LAWRENCE C. BRUNSTRUM.

CERTIFICATE OF CORRECTION.

Patent No. 2,108,644.

February 15, 1938.

LAWRENCE C. BRUNSTRUM.

It is hereby certified that error appears in the printed specification of the above numbered patent requiring correction as follows: Page 5, first column, line 73, claim 4, strike out the words "from about 3% to about 35% of" and insert the same before "calcium", same line and claim; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.